US008671348B2

(12) United States Patent
Lee et al.

(10) Patent No.: US 8,671,348 B2
(45) Date of Patent: Mar. 11, 2014

(54) METHOD AND APPARATUS FOR INPUTTING SCHEDULE IN MOBILE COMMUNICATION TERMINAL

(75) Inventors: Seungwon Lee, Seoul (KR); Jinwook Choi, Seoul (KR); Seungcheon Baek, Seoul (KR); Jungsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/202,992

(22) PCT Filed: Sep. 17, 2010

(86) PCT No.: PCT/KR2010/006441
§ 371 (c)(1),
(2), (4) Date: Aug. 24, 2011

(87) PCT Pub. No.: WO2012/036331
PCT Pub. Date: Mar. 22, 2012

(65) Prior Publication Data
US 2013/0174054 A1 Jul. 4, 2013

(51) Int. Cl.
*G06F 3/00* (2006.01)
(52) U.S. Cl.
USPC .......................................................... 715/753
(58) Field of Classification Search
USPC .......................................................... 715/753
See application file for complete search history.

(56) References Cited

U.S. PATENT DOCUMENTS

| | | | | |
|---|---|---|---|---|
| 6,006,227 A * | 12/1999 | Freeman et al. | | 707/695 |
| 6,992,587 B2 | 1/2006 | Maeda et al. | | |
| 2002/0186412 A1* | 12/2002 | Murashita | | 358/1.16 |
| 2003/0113109 A1* | 6/2003 | Pelletier | | 396/321 |
| 2004/0164844 A1 | 8/2004 | Maeda et al. | | |
| 2006/0143065 A1* | 6/2006 | Lim et al. | | 705/9 |
| 2009/0280859 A1* | 11/2009 | Bergh | | 455/556.1 |
| 2011/0199511 A1* | 8/2011 | Takahashi et al. | | 348/231.5 |

FOREIGN PATENT DOCUMENTS

| | | |
|---|---|---|
| KR | 10-20040076624 A | 9/2004 |
| KR | 10-2006075986 A | 7/2006 |
| KR | 10-2010045296 A | 5/2010 |
| KR | 10-2010079463 A | 7/2010 |

OTHER PUBLICATIONS

PCT International Search Report dated Jun. 21, 2011 for Application No. PCT/KR2010/006441, non-English Language, 2 pages.

* cited by examiner

*Primary Examiner* — William Bashore
*Assistant Examiner* — Rayeez Chowdhury
(74) *Attorney, Agent, or Firm* — Fish & Richardson P.C.

(57) ABSTRACT

A terminal includes: a camera configured to capture an image using a lens; a memory configured to store the image captured by the camera and identification information corresponding to the captured image; a controller configured to provide control to generate schedule information based on the identification information and to store the generated schedule information in a scheduler; and a display unit configured to display the generated schedule information or the scheduler under the control of the controller.

18 Claims, 8 Drawing Sheets

METHOD AND APPARATUS FOR INPUTTING SCHEDULE IN MOBILE COMMUNICATION TERMINAL

TECHNICAL FIELD

The present invention relates to a mobile terminal providing a multitasking environment by adjusting the size of a screen, and a control method thereof.

BACKGROUND ART

As mobile communication terminals are widely spreading, more people tend to manage schedules by using a mobile communication terminal, rather than using an electronic watch or an electronic scheduler. However, currently, mobile communication terminals are too complicated to input schedules, so users tend to input schedules with PCs and simply check the schedules with their mobile communication terminal. Thus, the necessity for easily creating or storing schedules by using a camera has emerged.

DISCLOSURE OF THE INVENTION

Therefore, an object of the present invention is to provide a method and apparatus for displaying a schedule of a mobile communication terminal capable of recognizing a user situation by using a sensor or schedule information and displaying an icon corresponding to the user situation on a scheduler, thus allowing the user to easily check a schedule.

To achieve these and other advantages and in accordance with the purpose of the present invention, as embodied and broadly described herein, there is provided a terminal including: a camera configured to capture an image using a lens; a memory configured to store the image captured by the camera and identification information corresponding to the captured image; a controller configured to provide control to generate schedule information based on the identification information and to store the generated schedule information in a scheduler; and a display unit configured to display the generated schedule information or the scheduler under the control of the controller.

The identification information is tagging information or text information corresponding to the captured image.

The controller provides control to store the generated schedule information in the scheduler in advance per a predetermined time when the tagging information is an event which is periodically repeated per the predetermined time.

The predetermined time is one week, one month or one year.

The controller may control the display unit to display the generated schedule information on the scheduler in an overlap manner.

The controller provides control to generate schedule information based on the identification information, when an event occurs.

The event occurs when input of the identification information corresponding to the captured image is completed, when a pre-set particular key is selected or when a touch input with respect to the captured image is occurred.

The identification information may include at least one of a date, time, a place, a name of a person, a title and detailed content.

The schedule information includes at least one of specific schedule content, schedule title, schedule date and time information.

The scheduler may be an application for managing a schedule and may be displayed in the form of a table on the display unit.

The terminal may further include: an input unit configured to input the tagging information, wherein the controller may control the input unit to input the tagged information based on a GPS receiver or a voice recognition sensor.

The terminal may further include: an audio output unit configured to convert the generated schedule information into a sound and output the same.

The controller provides control to extract a photo image corresponding to the name of the person from the memory and to display the photo image such that it is distinguishable from the captured image when the name of a person is included in the tagging information.

The terminal may further include: a wireless communication unit, wherein the controller controls the wireless communication unit to transmit the extracted photo image when a touch input with respect to the extracted photo image is occurred.

The controller provides control to display detailed information corresponding to the schedule information when a touch input with respect to the displayed schedule information is occurred.

The detailed information includes at least one of a review, a preview and recommended content corresponding to the captured image.

To achieve these and other advantages and in accordance with the purpose of the present invention, as embodied and broadly described herein, there is also provided a terminal including: a memory configured to store input schedule information and image information; a controller configured to provide control to extract schedule information or image information corresponding to a certain time interval among schedule information or image information stored in the memory when schedule information corresponding to current time is an event which is periodically repeated, wherein the certain time interval is from the current time to a predetermined time earlier than the current time; and a display unit configured to display the extracted schedule information or image information under the control of the controller.

The schedule information includes at least one of specific schedule content, schedule title, schedule date and time information.

The image information includes at least one of image captured by a camera and tagging information corresponding to the captured image.

The tagging information includes at least one of a date, time, a place, a name of a person and tagging of detailed content.

When a scheduler is executed, the controller may control the display unit to display the stored schedule information or the image information, and the scheduler may be an application for managing a schedule.

The controller may control the display unit to display the schedule information or the image information and the scheduler such that the schedule information or the image information are distinguishable from the scheduler.

When the number of pieces of the extracted schedule information or image information is greater than a pre-set number, the controller controls the display unit to display the extracted schedule information or image information by the pre-set number.

When the extracted schedule information or image information includes a plurality of items, the controller controls the display unit to display the plurality of items of the extracted schedule information or image information in sequential order, such as before reaching one year, one month, one week, or in the reverse order.

According to the exemplary embodiments of the present invention, the user can easily input or create a schedule by using an image captured by camera and use a scheduler like a diary, increasing the user convenience.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

The mobile terminal according to exemplary embodiments of the present invention will now be described with reference to the accompanying drawings.

In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

Figure 1:
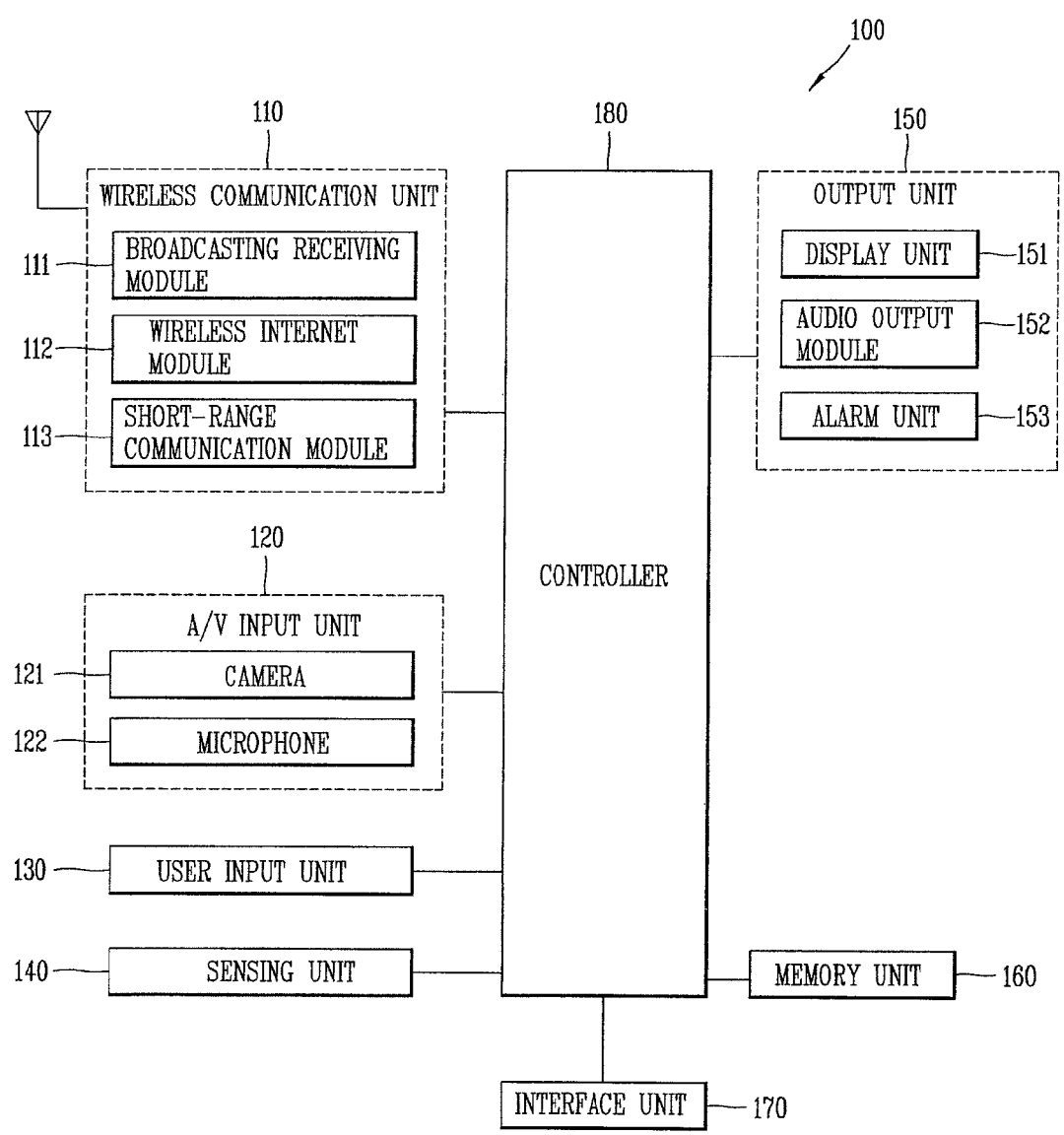
FIG. 1 is a schematic block diagram of a mobile terminal according to an exemplary embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit 110 may include at least one of a mobile communication module 111, a wireless Internet module 112, a short-range communication module, and a location information module 113.

The wireless Internet module 112 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 113 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

For example, one camera may operate with a relatively lower resolution to capture an image(s) of the user's face and immediately transmit such image(s) to another party in real-time during video call communication or the like, while another camera may operate with a relatively higher resolution to capture images of general objects with high picture quality, which may not require immediately transmission in real time. The cameras may be installed on the terminal such that they are rotated or popped up.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The user input unit 130 is manipulated to receive commands for controlling the operation of the mobile terminal 100, and may include a plurality of manipulation units. The manipulation units may be generally called a manipulating portion, and they can employ any methods so long as they can be manipulated in a tactile manner by the user.

Content inputted by the first and second manipulation units may be variably set. For example, the first manipulation unit receives commands such as start, end, scroll, or the like, and the second manipulation unit may receive commands such as adjustment of size of a sound outputted from the audio output unit 152 or conversion to a touch recognition mode of the display unit 151.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

When the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. Outputs informing about the occurrence of an event may be also provided via the display unit 151 or the audio output module 152. The display unit 151 and the audio output module 152 may be classified as a part of the alarm unit 153.

The memory 160 may store software programs used for the processing and controlling operations performed by the controller 180, or may temporarily store data (e.g., a phonebook, messages, still images, video, etc.) that are inputted or outputted. The memory 160 may store the frequency of use of each data (e.g., the frequency of use of respective phone numbers, respective messages, and respective multimedia). In addition, the memory 160 may store data regarding various patterns of vibrations and audio signals outputted when a touch is inputted to the touch screen.

Also, the memory stores an image captured by the camera and tagging (or tagged) information corresponding to the captured image. Here, the tagging information corresponding to the image may include at least one of date, time, a place, a name of a person, and detailed content. The date, time, and the place, among the tagged information, are automatically tagged without a user' input. Also, the substantial matters such as a name of a person, detailed content, and the like, are input by the user. The inputting of the tagged information may be performed through a key input unit or by voice. The inputting of the tagged information by voice may be performed through the microphone of the A/V input unit.

Namely, the microphone receives an external audio signal through in a voice recognition mode, or the like, and processes it into electrical voice data. The tagged information is generated by using the processed voice data.

Also, the memory stores photo information. The photo information may include various photo images such as a photo image of a person, a photo image of a scene, a photo image of a particular building, a photo image of a particular area, and the like.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, when an event occurs, the controller provides control to generate schedule information based on tagged information corresponding to an image captured by the camera of the A/V input unit. Here, the event occurs when inputting of the tagged information corresponding to the image is completed or when a touch input with respect to the captured image occurs. The schedule information refers to information including at least one of specific schedule content, schedule title, schedule date and time information.

Also, when the generated schedule information is an event having a repeated pattern, the controller controls the memory to store the generated schedule information. Also, the controller controls the display unit to display the scheduler including the stored schedule information. Here, the controller may control the display unit to display the generated schedule information and the schedule in an overlap manner. Here, the event having a repeated pattern corresponds to an event which periodically occurs weekly, monthly, and yearly. For example, the generated schedule information may be related to birthday, wedding anniversary, and the like, which periodically occurs yearly. The schedule information may be a meeting, or the like, which periodically occurs monthly. Also, the schedule information may be a meeting, club, and the like, which periodically occurs weekly. The scheduler may be an application (an application program) for managing schedule information. The scheduler may have various shapes. For example, the scheduler may have a shape of a table, or a shape of a diagram. Namely, the scheduler of a shape of a diagram may be an analog scheduler in a circular shape.

Also, when the tagged information includes a name of a person, namely, when the captured image is related to a particular meeting and includes names of participants, the controller may provide control to extract a photo image corresponding to the name of a person, namely, a participant, from the memory. Also, the controller may provide control to display the extracted photo image such that it is discriminated or distinguishable from the image. For example, the controller may provide control to display the extracted photo image at a lower or upper end portion of the image or at a left or right portion of the image.

Also, when a touch input with respect to the extracted photo image is occurred, the controller controls the wireless communication unit to transmit the photo image for which the touch input has occurred.

Also, after text information is extracted from the image captured through the camera, the controller may provide control to display the extracted text information or store it in the scheduler. Here, the text information refers to a date, time, a place, content, and the like, of the image. Also, when a touch input with respect to the extracted text information displayed on the display unit is occurred, the controller controls the display unit to display the extracted text information at the scheduler storing the extracted text information or at a particular position of the scheduler. Here, the particular position may be one of upper, lower, left and right portions of the scheduler. Also, the extracted text information may be displayed as a message in a pop-up manner.

Also, when a touch input with respect to the schedule information displayed on the display unit is occurred, the controller provide control to display detailed information related to the schedule information. Here, the detailed information may include a review, a preview, recommendation content, or the like, corresponding to the schedule information. Namely, when a touch input with respect to the schedule information displayed on the display unit is occurred, the controller provide control to perform Web searching on the background and display detailed information related to the schedule information.

Also, the controller may provide control to compare a date and time checked by the timer unit with at least one of image information and schedule information stored in the memory, extract at least one of the image information and schedule information corresponding to a certain time back from current time information and display the same. Here, the timer unit checks a current date and time in real time. Also, the memory stores the schedule information and image information. Here, the image information refers to an image captured by the camera and tagged information corresponding to the captured image. The certain time refers to time a week ago, a month ago or a year ago.

Also, the controller may control the display unit to display the image information and the schedule information such that they are discriminated, differentiated, or distinguishable from each other. Here, the discriminately displaying may be displaying the image information and the schedule information such that their positions are different and they have different sizes.

Also, when the number of at least one of the image information and the schedule information corresponding to a certain time back from the current time information is greater than a pre-set number, the controller may control the display unit to display at least one of the image information and the schedule information by the pre-set number (or threshold). Here, the pre-set number may be a value which can be changeable by the user or may be a value set as a default in the terminal.

Also, when the extracted schedule information or image information includes a plurality of items, the controller can control the display unit to display the plurality of items of the extracted schedule information or image information in sequential order, such as before reaching one year-one month-one week, or in the reverse order. Also, the controller provides control to display the extracted image information and schedule information according to a priority level. Here, the priority level may be previously set by the user. The controller may display the image information and the schedule information such that they have a different size or color according to their priority levels.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Exemplary embodiments of the present invention related to a control method that can be implemented in the terminal configured as described above will now be described in detail. The exemplary embodiments described hereinafter may be used alone or may be combined to be used. The exemplary embodiments described hereinafter may be combined with the foregoing user interface so as to be used.

Hereinafter, a case in which schedule information is generated by using identification information corresponding to an image captured by a camera and stored in a scheduler will now be described in detail.

The identification information may correspond to tagged information or text information.

First Embodiment

A first embodiment provides a method of generating schedule information on the basis of tagged information and storing the generated schedule information in a scheduler.

Figure 2:
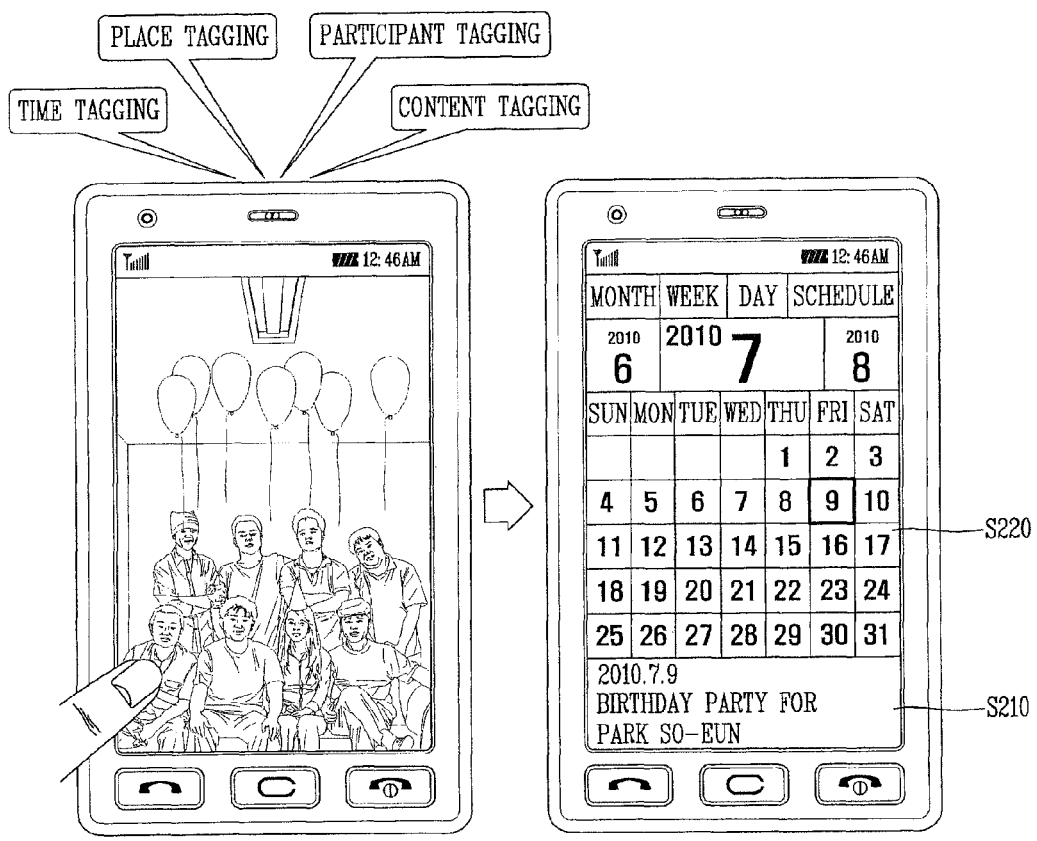
FIG. 2 is an overview of a display screen illustrating the functions of displaying schedule information according to a first exemplary embodiment of the present invention.

FIG. 2 is an overview of a display screen illustrating the functions of displaying schedule information according to a first exemplary embodiment of the present invention.

First, when an event occurs, the controller generates schedule information on the basis of tagged information corresponding to an image captured by a camera, and controls the memory to store the generated schedule information in a scheduler. Also, the controller provides control to display the generated schedule information and the scheduler storing the generated schedule information. The display unit displays the generated schedule information under the control of the controller. Also, the display unit displays the scheduler storing the generated schedule information.

Here, the event occurs when inputting of the tagged information corresponding to the image is completed, when a pre-set particular key is selected, when an image is captured by the camera, or when a touch input with respect to the captured image is occurred.

The case in which the inputting of the tagged information is completed refers to a case in which the user directly inputs the tagged information to the captured image or the tagged information is input through a voice. Also, the case in which the image is captured by the camera refers to a case in which the tagged information is automatically input by the terminal without a user's intervention. Also, when the case in which the pre-set particular key is selected or when the touch input occurs refers to a case in which a particular event occurs according to a user selection.

Here, the schedule information refers to information including at least one of specific schedule content, schedule title, schedule date and time information.

Here, the tagged information corresponding to the image may include at least one of a date, time, a place, a name of a person, a title, and detailed content. As described above, among the tagged information, date, time and a place may be automatically tagged without a user input. Also, specific matters such as a name of a person, detailed content, and the like, among the tagged information, may be directly input by the user or through a voice. Namely, the tagged information may be inputted through a key input unit or through a voice. In inputting the tagged information through a voice, a voice signal is converted into voice data through the microphone of the A/V input unit to thus generate tagged information.

Namely, the microphone receives an external audio signal in a voice recognition mode, or the like, and processes it into electrical voice data. The tagged information is generated by using the processed voice data.

Also, the scheduler is an application for managing a schedule, having various shapes. For example, the scheduler may be displayed in the form of a circular analog clock, a table, and the like, on the display unit.

As shown in FIG. 2, when a user's touch input is occurred, schedule information regarding the image captured by the camera is generated and displayed along with the scheduler (steps S210 and S220). Here, the schedule information may be displayed at any of upper, lower, left and right portions of the scheduler or may be displayed to overlap with the scheduler in a pop-up manner.

Second Embodiment

A second embodiment of the present invention provides a function of storing schedule information in the scheduler when the tagged information is an event of a periodically repeated pattern.

Figure 3:
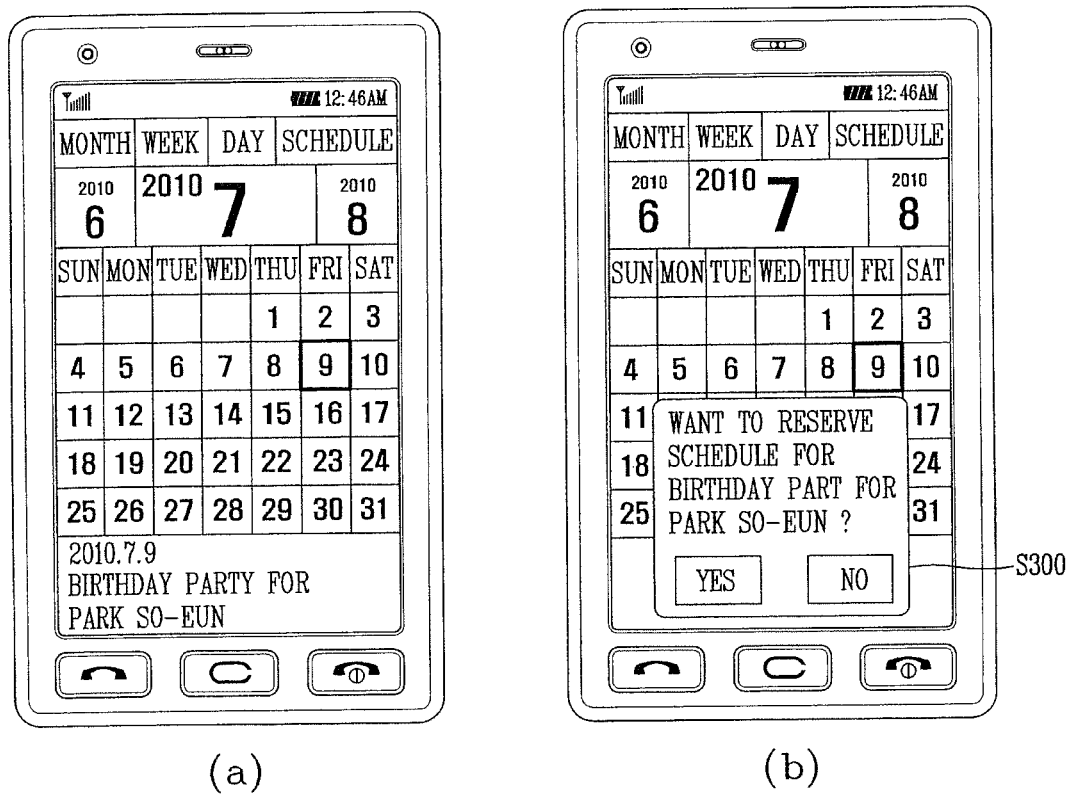
FIG. 3 is an overview of a display screen illustrating the functions of displaying schedule information according to a second exemplary embodiment of the present invention.

FIG. 3 is an overview of a display screen illustrating the functions of displaying schedule information according to a second exemplary embodiment of the present invention.

First, when tagged information corresponding to an image captured by the camera is an event of a repeated pattern, the controller provides control to in advance store the generated schedule information in the scheduler. Here, the event of the repeated pattern refers to an event which occurs periodically at every certain time. For example, the generated schedule information may be birthday, wedding anniversary, and the like which occurs periodically every year. Also, the schedule information may be a business meeting, or the like, which periodically occurs monthly. Also, the schedule information may be a team meeting, club, and the like, which periodically occurs weekly. The certain time refers to time corresponding one week, one month or one year.

Namely, when the tagged information is a periodically repeated event, the controller provides control to in advance store the generated schedule information in the scheduler at every certain time.

The scheduler may be an application (an application program) for managing a schedule. The scheduler may have various shapes. For example, the scheduler may have a shape of a table, or a shape of a diagram. For example, in the case of a diagram, the scheduler may have a shape of a circular analog clock.

For example, when the tagged information corresponding to the image captured by the camera is an event which is periodically repeated yearly, such as a birthday, a wedding anniversary, or the like, the event repeated at the corresponding date and time at every one year later from the date and time included in the tagged information is previously stored in the scheduler. Namely, when the current date and time of the repeated event is 9:00, a.m., Sep. 6, 2010, the repeated event is previously stored in the scheduler as 9:00, a.m., Sep. 6, 2011, 9:00, a.m., Sep. 6, 2012.

Also, the controller controls the display unit to display a message pop-up window regarding whether to previously store the generated schedule information in the scheduler. Namely, the generated schedule information may be previously stored in the scheduler according to a user selection. Here, the user selection may be a touch input with respect to the displayed message pop-up window.

As shown in FIG. 3(b), the display unit displays a message pop-up window displaying whether to previously store the generated schedule information in the scheduler under the control of the controller (step S300).

Third Embodiment

A third embodiment of the present invention provides a function of extracting and displaying a photo image corresponding to a name of a person when the name of the person is included in the tagged information.

Figure 4:
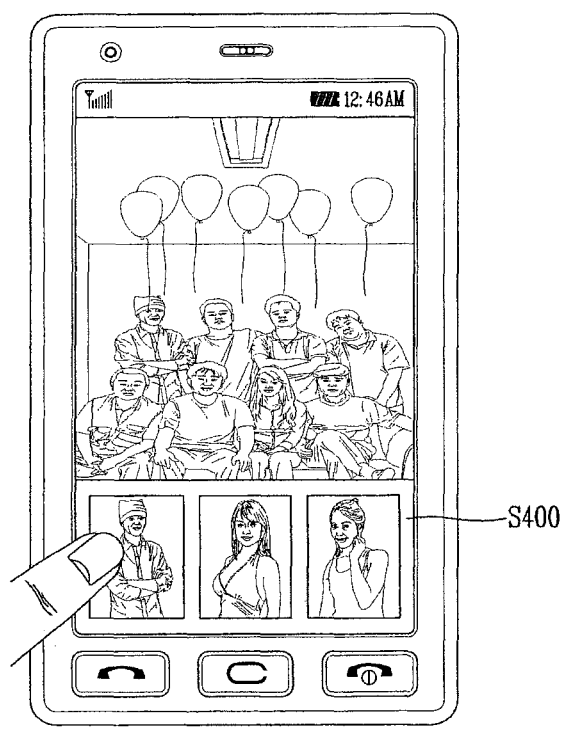
FIG. 4 is an overview of a display screen illustrating a function of sharing photo images with participants included in tagged information according to a third exemplary embodiment of the present invention.

FIG. 4 is an overview of a display screen illustrating a function of sharing photo images with participants included in tagged information according to a third exemplary embodiment of the present invention.

When a name of a person is included in the tagged information corresponding to an image captured by the camera, the controller extracts a photo image corresponding to the name of the person from the memory and controls the display unit to display the extracted photo image. Namely, when a participant included in the image captured by the camera is tagged, the controller extracts a photo image of the participant from the memory and controls the display unit to display the extracted photo image.

Also, the controller provides control to display the extracted photo image such that it is discriminated, differentiated or distinguishable from the captured image. For example, the controller provides control to display the extracted photo image on at least one of a lower, upper, left and right portions of the image. Also, the controller controls the display unit to display the extracted photo image such that it overlaps with the image.

Also, when an event such as a touch input with respect to the extracted photo image occurs, the controller controls the wireless communication unit to transmit the event-occurred photo image to a corresponding person.

As shown in FIG. 4, the display unit displays the extracted photo image at a lower end portion of the captured image under the control of the controller (step S400). Also, when the user touches the photo image of the participant displayed at the lower end portion of the image captured by the camera, the touched photo image can be transmitted to the participant so as to be shared therebetween.

Fourth Embodiment

A fourth embodiment of the present invention provides a function of extracting text information corresponding to an image captured by the camera to generate schedule information and storing the generated schedule information in the scheduler.

Figure 5:
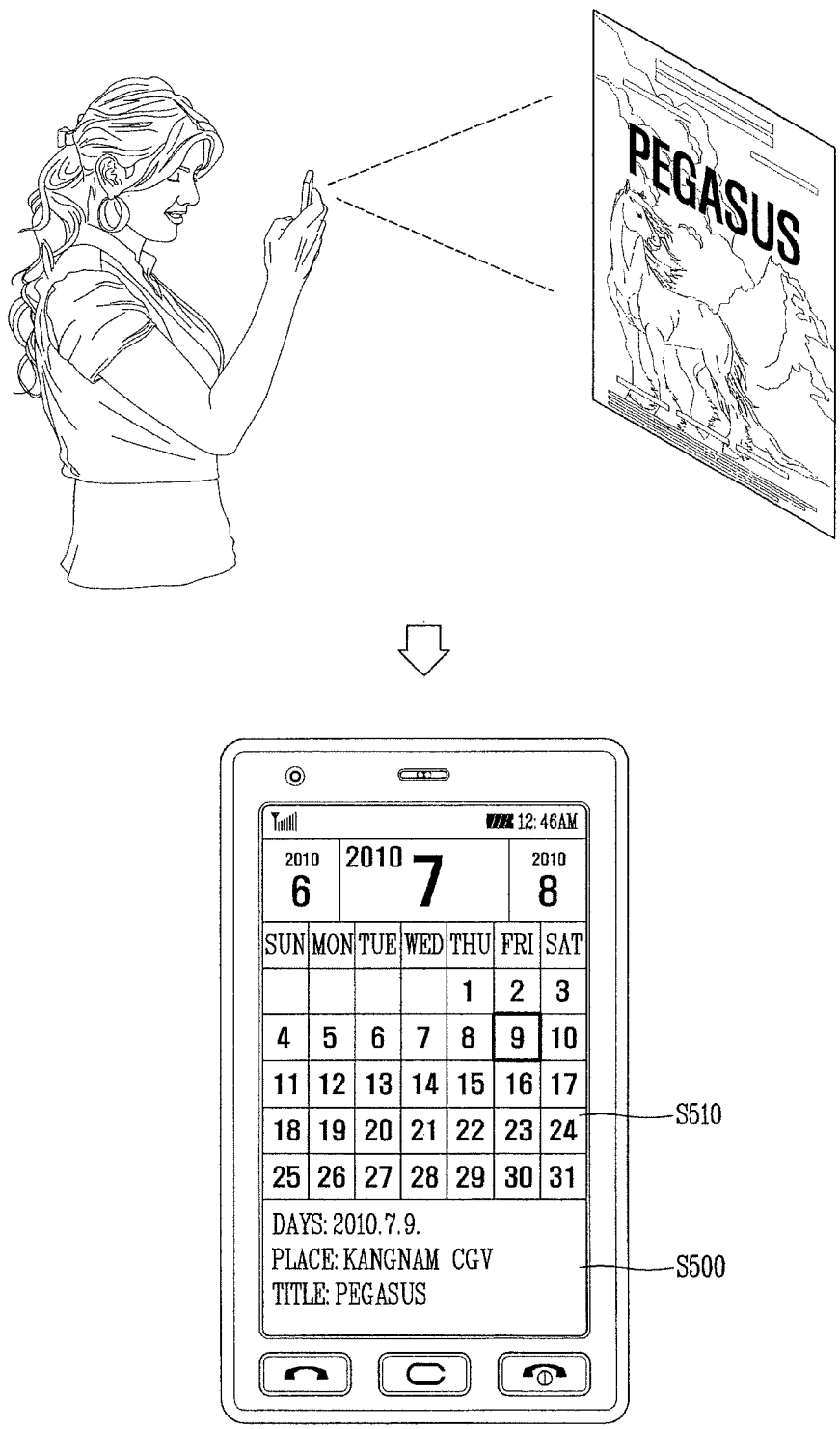
FIG. 5 is a view illustrating a schedule information display function according to a fourth exemplary embodiment of the present invention.

FIG. 5 is a view illustrating a schedule information display function according to a fourth exemplary embodiment of the present invention.

The controller extracts text information from an image captured by the camera to generate schedule information and provides control to store the generated schedule information in the scheduler. Here, the text information refers to information including a date, time, a place, content, and the like, related to the image. Also, the image may be a poster image of a movie, a play, a musical concert, and the like.

Also, the controller controls the display unit to display a message pop-up window displaying whether to store the generated schedule information in the scheduler. When a touch input with respect to the message pop-up window occurs, the controller controls the memory to store the generated schedule information in the scheduler.

Also, the controller provides control to display the generated schedule information and the scheduler including the generated schedule information such that they are discriminated from each other. Here, the case in which the scheduler includes schedule information and the case in which the scheduler does not include schedule information are displayed discriminately. For example, the size of a date displayed in the scheduler may be increased or the color thereof may be different, to thus discriminately display the scheduler from that not including schedule information.

The schedule information may be displayed at any one of upper, lower, left and right portions of the scheduler. Also, the schedule information may be displayed to overlap with the scheduler in a message pop-up manner.

As shown in FIG. 5, the display unit displays the generated schedule information under the control of the controller (step S500), and displays the scheduler storing the generated schedule information (step S510).

Figure 6:
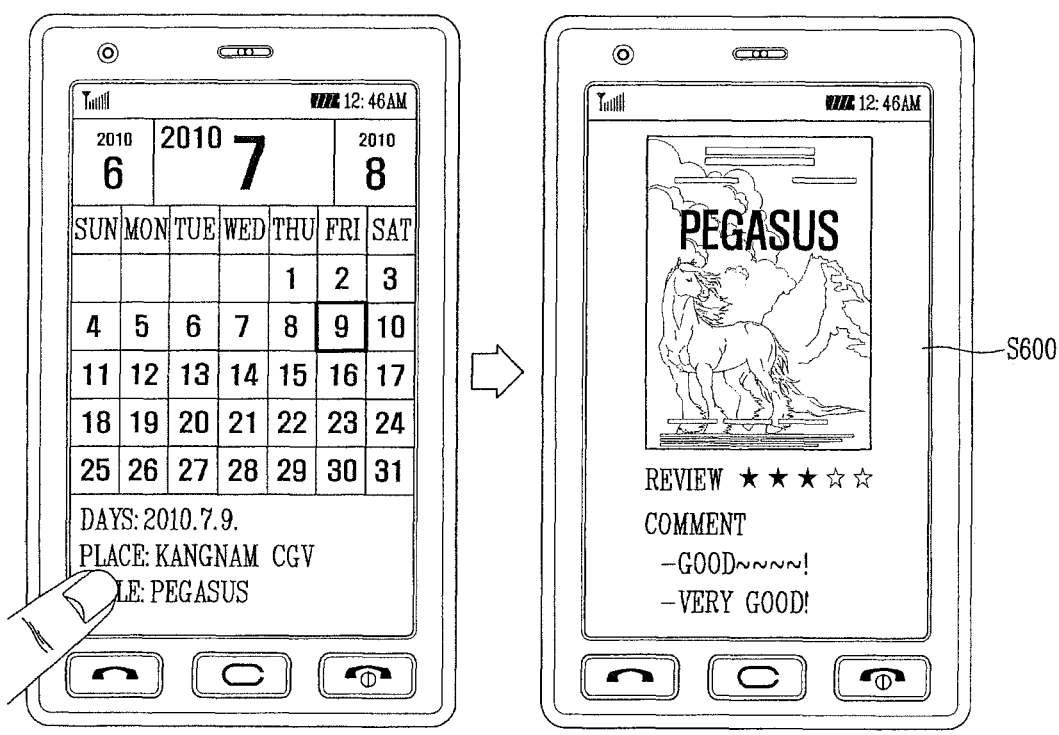
FIG. 6 is an overview of display screens illustrating a function of displaying detailed information corresponding to schedule information according to the fourth exemplary embodiment of the present invention.

FIG. 6 is an overview of display screens illustrating a function of displaying detailed information corresponding to schedule information according to the fourth exemplary embodiment of the present invention.

When a touch input with respect to schedule information displayed on the display unit occurs, the controller provides control to display detailed information related to the schedule information. Namely, when a touch input with respect to the schedule information displayed on the display unit occurs, the controller provides control to display detailed information related to the schedule information through Web search. The Web search is performed through a search application (application program) executed in the background.

Also, the detailed information may include a review, a preview, recommended content, and the like, corresponding to the schedule information. For example, when the schedule information is information corresponding to a movie, the detailed information may be a review of people with respect to the movie, a preview with respect to the movie, and post reply or comments of people with respect to the movie.

As shown in FIG. 6, when the touch input occurs, the display unit displays the detailed information related to the schedule information under the control of the controller (step S600).

Hereinafter, a method of displaying schedule information and image information which was stored a week ago, a month ago, and a year ago will now be described in detail.

Fifth Embodiment

A fifth embodiment of the present invention provides a method of displaying schedule information or image information of a certain time back from a current date.

Figure 7:
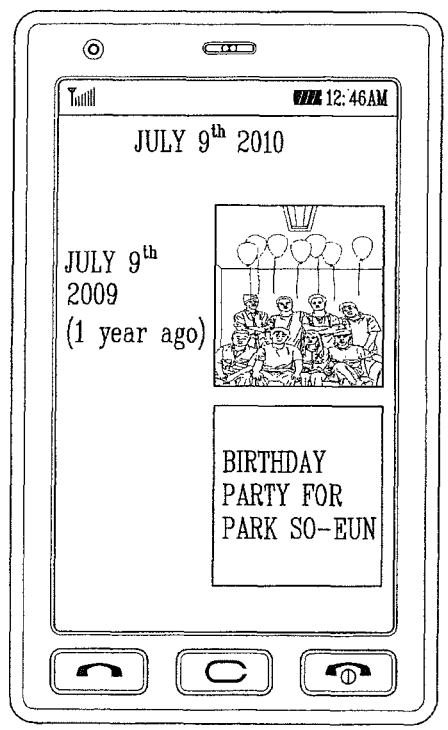
FIG. 7 is an overview of a display screen illustrating a function of displaying schedule information or image information according to a fifth exemplary embodiment of the present invention.

FIG. 7 is an overview of a display screen illustrating a function of displaying schedule information or image information according to a fifth exemplary embodiment of the present invention.

The controller compares time information checked by a timer with schedule information or image information stored in the memory, extracts schedule information or image information of a certain time back from current time information, and provides control to display the extracted information. Here, the time information refers to a date and time. Namely, when schedule information corresponding to the date checked by the timer unit is a periodically repeated event, the controller extracts schedule information or image information of a certain time back from the checked date and provides control to display the extracted information. Here, the periodically repeated event refers to a birthday, a wedding anniversary, a meeting, and the like, which periodically occurs weekly, monthly, and yearly. The timer refers to a clock, and the clock indicates a date and time.

When the schedule information or the image information is executed by the scheduler, the controller provides control to display it. The scheduler is an application for managing a schedule and may have various shapes. For example, the scheduler may have a table form.

The schedule information may include at least one of specific schedule content, schedule title, date and time information. Also, the image information includes at least one of an image captured by the camera and tagged information corresponding to the image. The certain time refers to one week, one month, one year, and the like.

When the number of schedule information or the image information of a certain time back from the time information checked by the timer unit is greater than a pre-set number, the controller controls the display unit to display the schedule information or the image information by the pre-set certain number. Here, the pre-set number may be set to be changeable by the user, or may be a value set as a default in the terminal.

Sixth Embodiment

A sixth embodiment of the present invention provides a method for displaying schedule information or image information when the schedule information or image information includes a plurality of items.

Figure 8:
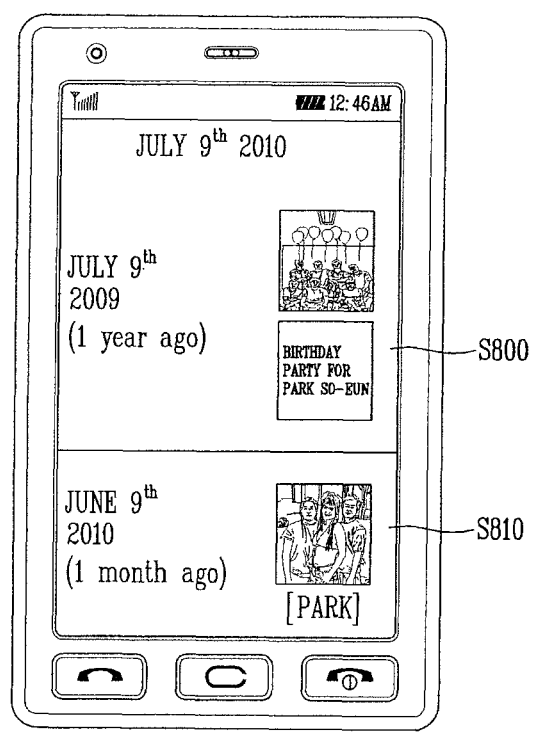
FIG. 8 is an overview of a display screen illustrating a function of displaying schedule information or image information according to a sixth exemplary embodiment of the present invention.

FIG. 8 is an overview of a display screen illustrating a function of displaying schedule information or image information according to a sixth exemplary embodiment of the present invention.

When the schedule information or image information extracted from the memory includes a plurality of items, the controller controls the display unit to display the plurality of items of the extracted schedule information or image information in sequential order, such as before reaching one year, one month, one week, or in the reverse order.

Also, the controller controls the display unit to display the extracted schedule information or image information according to their priority levels. Here, the priority levels may be previously set by the user. Also, the controller controls the display unit to display the items of the schedule information or image information displayed according to their priority levels such that they have different sizes and colors.

As shown in FIG. 8, the display unit displays image information a year ago from a current date under the control of the controller (step S800), and also displays image information a month ago from the current date (step S810).

In the embodiments of the present disclosure, the above-described method can be implemented as codes that can be read by a processor in a program-recorded medium. The processor-readable medium includes a ROM, a RAM, a CD-ROM, a magnetic tape, a floppy disk, an optical data storage device, and the like. The processor-readable medium also includes implementations in the form of carrier waves or signals (e.g., transmission via the Internet).

The exemplary embodiments of the present disclosure have been described with reference to the accompanying drawings.

The terms used in the present application are merely used to describe particular embodiments, and are not intended to limit the present disclosure.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A terminal comprising:
a camera configured to capture an image using a lens;
a memory configured to store the image captured by the camera and identification information corresponding to the captured image;
a controller configured to provide control to generate schedule information based on the identification information and to store the generated schedule information in a scheduler; and
a display unit configured to display the generated schedule information and the scheduler under the control of the controller,
wherein the controller is further configured to:
extract, from the memory, at least one photo image corresponding to a person whose name is included in the identification information corresponding to the captured image,
display the at least one photo image such that it is distinguishable from the captured image, and
transmit the captured image to the person whose name is included in the identification information corresponding to the captured image when a touch input has occurred with respect to the extracted at least one photo image corresponding to the person whose name is included in the identification information.

2. The terminal of claim 1, wherein the identification information is tagging information or text information corresponding to the captured image.

3. The terminal of claim 2, wherein the controller provides control to store the generated schedule information in the scheduler in advance per a predetermined time when the tagging information is an event which is periodically repeated per the predetermined time.

4. The terminal of claim 3, wherein the predetermined time is one week, one month or one year.

5. The terminal of claim 1, wherein the controller controls the display unit to display the generated schedule information on the scheduler in an overlap manner.

6. The terminal of claim 1, wherein the controller provides control to generate schedule information based on the identification information, when an event occurs.

7. The terminal of claim 6, wherein the event occurs when input of the identification information corresponding to the captured image is completed, when a pre-set particular key is selected or when a touch input with respect to the captured image has occurred.

8. The terminal of claim 1, wherein the identification information includes at least one of a date, time, a place, a name of a person, a title or detailed content.

9. The terminal of claim 1, wherein the schedule information includes at least one of specific schedule content, schedule title, schedule date or time information.

10. The terminal of claim 1, wherein the scheduler is an application for managing a schedule and is displayed in the form of a table on the display unit.

11. The terminal of claim 2, further comprising:
an input unit configured to input the tagging information, wherein the controller controls the input unit to input the tagging information based on a Global Positioning System (GPS) receiver or a voice recognition sensor.

12. The terminal of claim 1, further comprising:
an audio output unit configured to convert the generated schedule information into a sound and to output the sound.

13. The terminal of claim 1, wherein the controller provides control to display detailed information corresponding to the schedule information when a touch input with respect to the displayed schedule information has occurred.

14. The terminal of claim 13, wherein the detailed information includes at least one of a review, a preview or recommended content corresponding to the captured image.

15. The terminal of claim 1, wherein
the controller is further configured to extract text information included in the captured image, generate schedule information using the extracted text information, and store the generated schedule information to a scheduler.

16. The terminal of claim 15, wherein the text information includes information including a date, time, a place and detailed content.

17. The terminal of claim 15, wherein the captured image includes a poster image of a movie, a play or a musical concert.

18. The terminal of claim 15, wherein the controller is further configured to display the extracted stored scheduled information together with the scheduler when the scheduler is executed, and display detailed information related to the schedule information when the displayed schedule information is selected.

* * * * *